INVENTORS
JOHN F. PAGE &
LUIS A. FERNANDEZ RIVAS
BY Morris L. Rabkin
ATTORNEY

INFORMATION STORAGE AND TRANSFER SYSTEM

Filed Dec. 3, 1956 2 Sheets-Sheet 2

INVENTOR.
JOHN F. PAGE &
LUIS A. FERNANDEZ RIVAS
BY Morris ... Rabkin
ATTORNEY

United States Patent Office 3,059,221

Patented Oct. 16, 1962

3,059,221
INFORMATION STORAGE AND TRANSFER SYSTEM

John F. Page, Haddonfield, N.J., and Luis A. Fernandez Rivas, Levittown, Pa., assignors to Radio Corporation of America, a corporation of Delaware Filed Dec. 3, 1956, Ser. No. 625,958
9 Claims. (Cl. 340—172.5)

Figure 1:
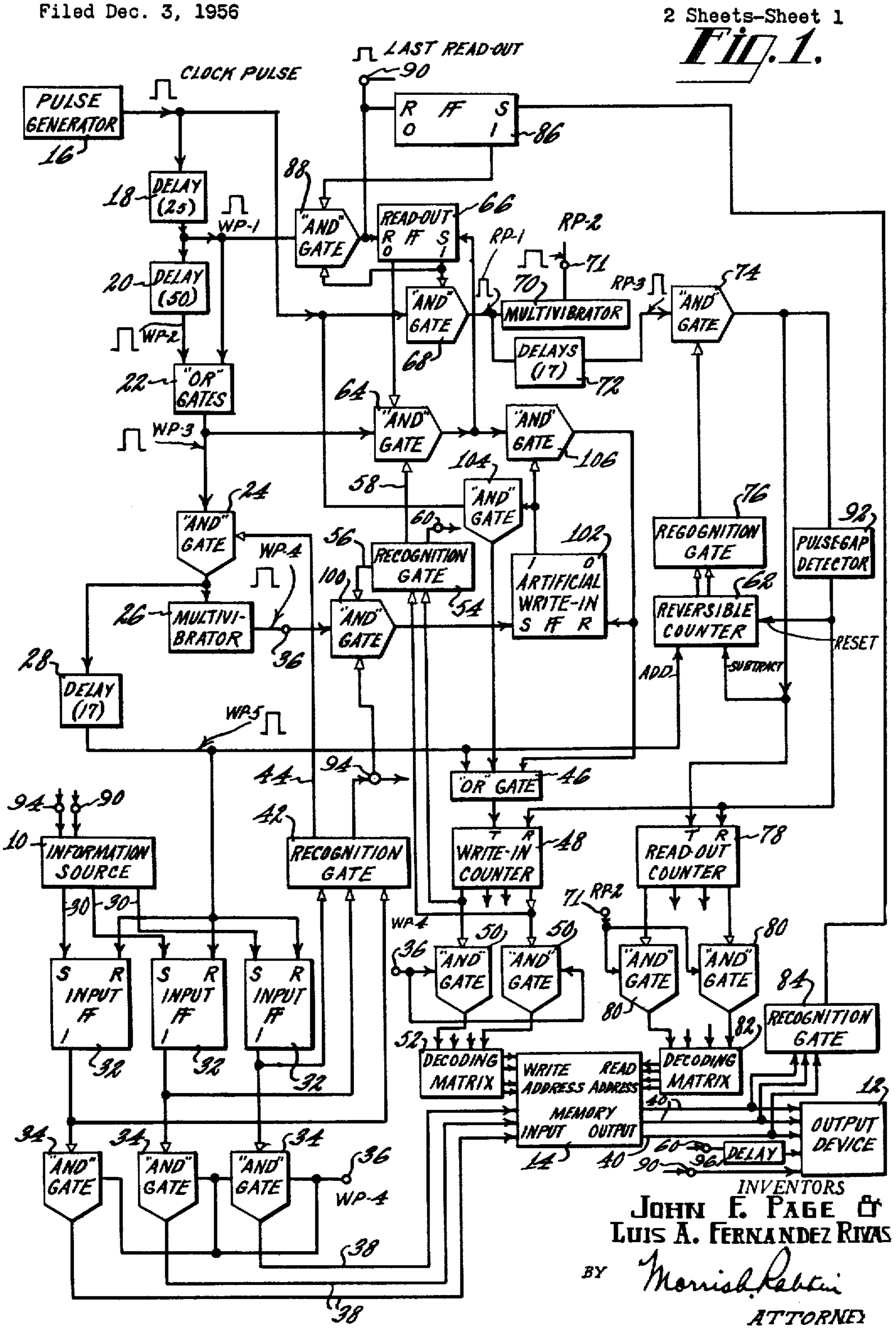

This invention relates to digital information handling systems, and particularly to an information storage and transfer system that may be used as a buffer storage between information handling devices that operate at different rates.

Difficulties arise in transferring information from one information handling device to another, say from an input device to an output device, because the rates at which these devices can handle information may be different, and at least one of the rates may not be uniform. As a result, these devices cannot be synchronized to a common timing reference. In order to transfer information from the input device to the output device, a time transfer system or information storage, sometimes called a buffer storage, is required which can operate at information rates consistent with both devices.

Accordingly, it is among the objects of this invention to provide:

A new and improved information storage system;

A new and improved system for transferring information between information handling devices that operate at different rates;

A new and improved information storage system for controlling the information transfer in the proper sequence;

A novel buffer storage system that is improved with respect to transferring information to or from a device operating at a non-uniform information rate.

In accordance with this invention, an information storage system receives information from an input device and transfers this information to an output device. One of the input and output devices operates at an irregular rate while the other may operate periodically at a uniform rate approximately equal (within the range of irregularity) to the irregular rate. The storage system includes a memory having a certain number of serially ordered stages, each adapted to store a unit of information. This system also includes a counting means for directing the write-in and read-out operations at appropriate locations of the memory to ensure that the order of read-out information is consistent with that written in. The input device supplies information units (information signals) to the storage system in blocks of serially ordered units, with each block having as much as a certain number of units. The storage system receives each block of information at the input-device rate and transfers it to the output device at the output-device rate. The transfer of a block of information takes place without either the input or output device stopping during its respective portion of transfer operation; and these devices operate at the same time for at least part of the transfer period. The capacity of the memory is substantially less than the size of a block of information. This memory capacity is a function of the input-device and output-device rates and of the maximum information block size.

Figure 2:
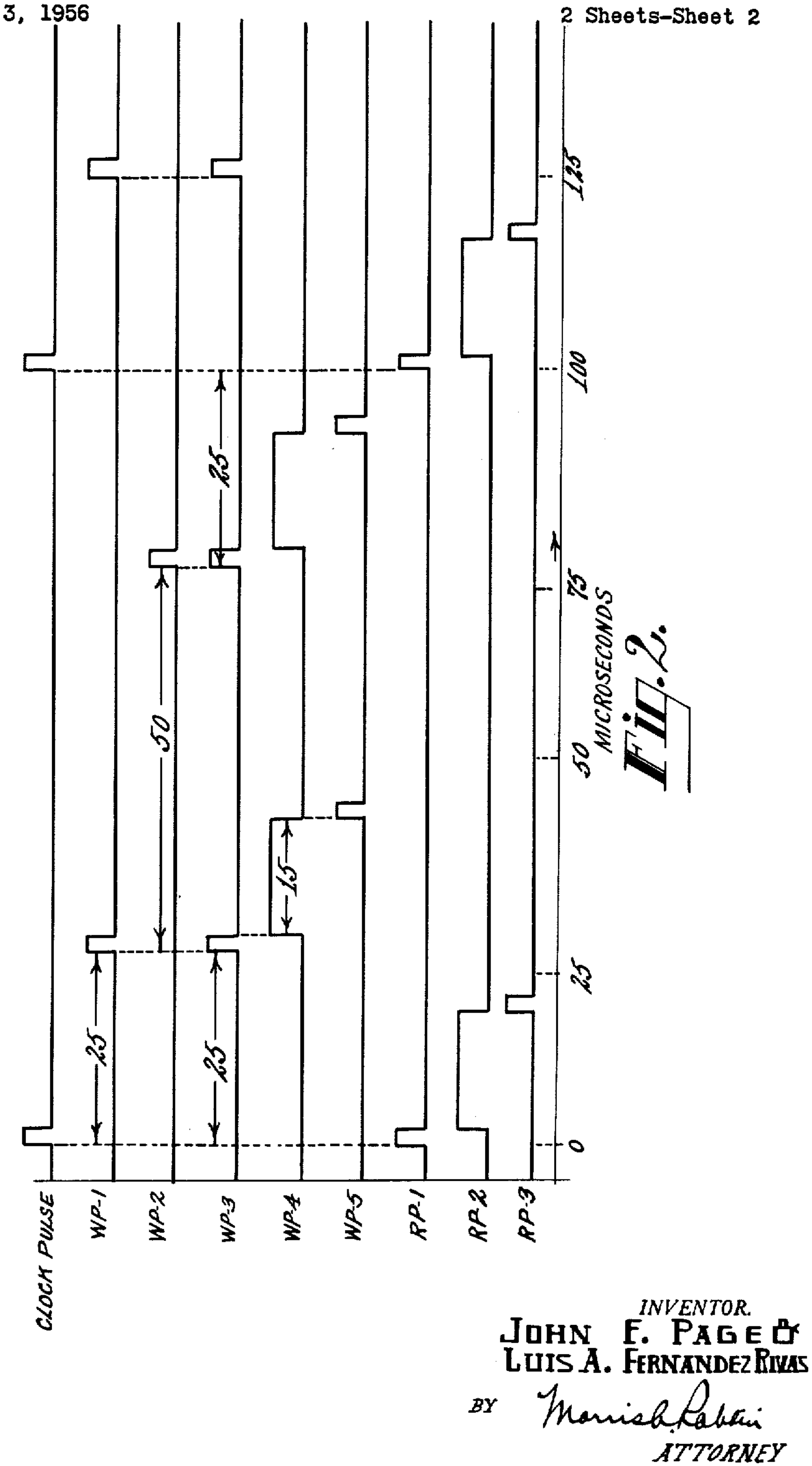

The foregoing and other objects, the advantages and novel features of this invention, as well as the invention itself both as to its organization and mode of operation, may be best understood from the following description when read in connection with the accompanying drawing, in which like references refer to like parts, and in which:

FIGURE 1 is a schematic block diagram of a serial information storage system embodying this invention, and FIGURE 2 is an idealized timing graph of the relationship of certain waveforms occurring at portions of the system of FIGURE 1.

In FIGURE 1, an information source 10 is shown on the left, which source 10 may be, for example, operating at a fluctuating rate. This information source 10 may be a station for reading magnetic tape that has digital information signals recorded thereon. At the right of FIGURE 1, an output device 12 is shown, which device 12 may be, for example, operating periodically and regularly at a certain frequency *f*. This output device 12 may be a station for recording digital information signals on magnetic tape.

A memory 14 is used for transferring information from the informtaion source 10 to the output device 12 at information rates that are compatible to both the source 10 and the output device 12. A pulse generator 16 may be part of, or otherwise associated with, the output device 12. This generator 16 provides clock pulses periodically at a frequency *f*, which clock pulses are used to operate the output device 12 synchronously at the frequency *f*. To illustrate the time relationship of various pulses, this frequency *f* may be 10 kilocycles per second, so that the time between pulses is 100 microseconds. However, this invention is not restricted to any particular rate of operation, fast or slow.

Five "write pulses" (WP–1 to WP–5) are generated to control the writing of information into the memory 14. These write pulses (the relationships of which are shown graphically in FIGURE 2) are generated from the clock pulses supplied by the pulse generator 16. These clock pulses are applied to a delay line 18 having a delay period of, say, 25 microseconds (a period consistent with the aforementioned illustrative pulse frequency). The output of the delay line 18 is WP–1 which is applied to second delay line 20 of, say, 50 microseconds delay. The output of the delay line 20 is WP–2, which pulse, together with WP–1, is applied to an "or" gate 22. The output of the "or" gate 22 is WP–3, which pulse occurs at a 20 kilocycle rate, every 50 microseconds, but 25 microseconds out-of-phase with the clock pulse from the pulse generator (see FIGURE 3). The rate of WP–3 is the maximum permissible repetition rate of signals from the source 10.

The pulse WP–3 is applied to an "and" gate 24, which gate 24 passes WP–3 (under certain circumstances) to a multivibrator circuit 26 that may be of the one-shot type triggered by the trailing edge of the received pulse WP–3. This multivibrator 26 is used for generating a relatively long pulse (illustratively, 15 microseconds long), which pulse is WP–4. The write pulse WP–3 passed by the gate 24 is also applied to a delay line 28 (illustratively, of 16 microseconds delay), the output of which is WP–5.

The information signals from the source 10 (which may take the form of binary signals such as the pulse and the absence of a pulse) are produced at parallel input channels 30. Each combination of signals (that includes at least one pulse) occurring at the same time at the parallel channels 30 forms a code group that is treated as an information unit and hereinafter called an "information character." Only three information channels are shown in the system of FIGURE 1 by way of illustration; however, as many information channels as desired may be employed. Two known information systems employ five and seven parallel channels, respectively; in such systems, five and seven information channels 30, respectively, would be employed.

Each channel 30 from the source 10 is connected to one input, the S-input, of a separate input flip-flop 32. These flip-flops 32 (and others shown in FIGURE 1 and described hereinafter) each may be a bistable trigger circuit having two input terminals designated "S" and "R" and two output terminals designated "1" and "0." The application of a pulse to the S-input sets the flip-flop circuit with its 1-output established at a relatively high voltage level and its 0-output established at a low output level. The application of a pulse to the R-input resets the flip-flop circuit to assume the reverse conditions. One output (illustratively, the 1-output) of each flip-flop 32 is connected to a separate "and" gate 34. The write pulse WP–4 at the output 36 of the multivibrator 26 is applied to a second input of each of the "and" gates 34. The outputs of the "and" gates 34 on channels 38 are applied to the inputs of the memory 14. The outputs of the memory 14 appear on channels 40, which channels 40 are connected to the inputs of the output device 12.

The outputs of the flip-flop 32 are applied to the inputs of a circuit called a "code recognition gate" 42. This recognition gate 42 is the type of circuit that produces a certain output signal such as a voltage level or pulse when it receives certain input code combinations. The recognition gate 42 is particularly designed to produce a certain voltage level at the output connection 44 each time it "recognizes" the flip-flop condition of the input flip-flops 32 containing an input character; this flip-flop condition is any combination of conditions in the flip-flops 32 other than all of the flip-flops being in the reset condition. When the flip-flops 32 contain an information code character, the gate 42 provides a voltage level on the connection 44 that "enables" or opens the gate 24 to pass the next occurring write pulse WP–3. This pulse WP–3, after an appropriate delay in the delay line 28, is formed as WP–5 to reset the input flip-flops 32. The delay of the delay line 28 is such that the flip-flops 32 are not reset until the write pulse WP–4 has gated the character set up in the flip-flops 32 through the gates 34 into the memory 14. The resetting of the flip-flops 32 by WP–5 takes place after termination of WP–4.

The write pulse WP–5 is also applied through an "or" gate 46 to the trigger input of a write-in counter 48. The counter 48 is a binary counter having a plurality of serially coupled stages, only one of which is shown in FIGURE 1 (to simplify the drawing). This counter 48 may be any conventional form which counts to its capacity, resets to zero, and cyclically recounts from zero. The outputs of the counter 48 are applied to separate "and" gates 50, which also receive WP–4. The outputs of the "and" gate 50 are applied to a decoding matrix 52, which is needed to "decode" the outputs of a plurality of counter stages. The matrix 52 has a plurality of outputs each of which corresponds to a different combination of its binary inputs. This matrix 52 energizes the one of its outputs corresponding to the combination of binary signals that it receives from the counter 48 via the gates 50.

The outputs of the matrix 52 are applied to the write-in address inputs of the memory 14. The energized output of the matrix 52 is connected to a particular one of the memory addresses to which the character signals in the channels 38 are to be directed. For example, if the memory has four storage locations or addresses, two binary stages are provided in the binary counter 48 permitting it to count repeatedly in a cycle of four digits 0, 1, 2, 3, 0, 1, . . . , in binary form. The matrix 52 converts the binary-counter outputs to an energization of the corresponding one of the four address inputs of the memory 14. The character then appearing in the channels 38 is written in this memory address. The outputs 40 may be isolated from the memory locations during the write-in operation.

Before the write-in operation is started, the write-in counter 48 is reset to the 0-count condition (as are all other settable components such as the flip-flops 32). The first character supplied by the information source 10 is established in the input flip-flops 32. As a result, the recognition gate 42 opens the "and" gate 24 to pass the next write pulse WP–3. The resulting write pulse WP–4 is applied to the gates 34 and to the gates 50 to write the character established in the flip-flops 32 at the memory address corresponding to the 0-count in the counter 48.

The succeeding WP–5 then resets the flip-flops 32. The resetting of the input flip-flops 32 removes the enabling voltage level applied to the "and" gate 24, and thereby prevents the generation of another write pulse WP–4 prior to the next character being applied from the source 10. This same resetting pulse WP–5 is applied via the "or" gate 46 to the counter 48 to advance the count of that counter 48 to the count of 1.

When the second information character is received by the input flip-flops 32, the "and" gate 24 is again opened to permit the passage of the next WP–3, which results in generation of WP–4. This pulse WP–4 applied to the gates 34 and the gates 50 actuates the writing-in to the memory 14 of the second information character in the memory address corresponding to a count of 1 in the write-in counter 48. The succeeding WP–5 resets the input flip-flops 32, and advances the write-in counter 48 to the count of 2. This write-in cycle is repeated for each input character that is received from the source 30.

The write pulse WP–5 is also applied to a reversible counter 62 via the "add," or "count-up" input of that counter. This reversible counter 62 is used in the control of the read-out operations to be described hereinafter.

The read-out operation does not start until a certain amount of write-in has taken place. For example, if the rate of information is supplied by the source 10 is always greater than the rate at which information is read-out to the output device 12, the read-out operation may start immediately after the first character is read into the memory. For the present, the read-out frequency is assumed to be equal to the average of the input frequency, and, for reasons discussed hereinafter, the read-out operation is not permitted to start until the memory is half full.

This half-full condition of the memory 14 is recognized by another code recognition gate 54, which gate 54 receives the outputs of the write-in counter 48. This recognition gate 54 provides enabling voltage levels at a different one of three outputs 56, 58, and 60, respectively, depending upon the count established in the write-in counter 48. When the count in the counter 48 indicates that the memory 14 is just half full, an enabling voltage is applied via the connection 58 to an "and" gate 64. This "and" gate 64 passes the next write pulse WP–3 to the S-input of a read-out flip-flop 66.

The 1-output of the read-out flip-flop 66 provides an enabling voltage level for another "and" gate 68 that passes the next clock pulse from the generator 16 to provide the first read pulse RP–1. This read pulse RP–1 is applied to a one-shot multivibrator 70 to form a relatively long pulse RP–2 at the connection 71, and to a delay line 72 to form another read pulse RP-3 (in a manner similar to the formation of WP–4 and WP–5, which is described above).

The read pulse RP–3 is applied to an "and" gate 74, which gate 74 also receives an enabling voltage level from another recognition gate 76 when the reversible counter 62 registers a count other than 0-count. The output of the gate 74 is applied to the trigger input of a read-out counter 78, which may be similar to the write-in counter 48. The outputs of the read-out counter are applied to "and" gates 80, which also receive the read pulses RP–2 at the connection 71. The outputs of the gates 80 are applied to a decoding matrix 82, which energizes the one of the memory addresses corresponding to the count then registered in the read-out counter 78. Thereby, the information stored at that memory location is read out of the memory 14 by way of the output connections 40, and is applied to the output device 12 for utilization there.

The memory outputs 40 are also connected to a code recognition gate 84 which recognizes a certain special character (or characters) used to make the end of a block of characters. When the gate 84 recognizes such a "terminal character" it provides a signal to set a flip-flop 86. The 1-output of this flip-flop is applied to an input of an "and" gate 88. This gate 88 also receives the 1-output of the read-out flip-flop 66 as well as the write pulse WP–1. The output of the "and" gate 88 is applied to the R-inputs of the flip-flops 66 and 86 and also to a terminal 90. This terminal 90 may be connected as control inputs to the information source 10 and the output device 12.

The read pulse RP–3 passed by the gate 74 is also applied to the "subtract," or "count-down," input of the reversible counter, and is applied to a detecting circuit 92. The output of the circuit 92 is applied to the reset inputs of the three counters 48, 62, and 78. This detecting circuit 92 operates to provide a resetting pulse to these three counters 48, 62, 78 when it does not receive an input pulse for a certain period of time. Thus, if there is a gap in the train of read pulses RP–3 passed by the gate 74 for an appropriate period of several pulse cycles indicating the end of an information block, the circuit 92 is operated to reset the three counters in preparation for the next block of information.

The read-out operation, as mentioned above, is initiated by the write-in counter 48 registering that the memory has received a certain number of input characters, say, that the memory is half full. This condition is recognized by the gate 54 and an enabling level is applied to the gate 64. At this time, the read-out flip-flop 66 is in the reset condition, which results in an additional enabling level being applied to the "and" gate 64 from the 0-out put of the flip-flop 66. Consequently, the gate 64 is opened to pass the succeeding write pulse WP–3 to set the read-out flip-flop 66. The setting of the flip-flop 66, in turn, opens the gate 68. The next clock pulse from the generator 16 is then passed by the gate 68.

The read pulse RP–1 that is so passed by the gate 68 is applied to the multivibrator 70 to generate RP–2. This read pulse RP–2 is applied to the read-out gates 80 to initiate read-out of the first information character at the memory address corresponding to the 0-count then registered in the read-out counter 78. Generally, each memory address corresponds to the same counts of the write-in and read-out counters 48 and 78, so that the first character written in is also the first to be read out.

After this first read-out operation initiated by RP–2 is terminated, the read pulse RP–3 is passed by enabled gate 74 to trigger the read-out counter 78 and advance it to a count of 1. This same pulse RP–3 is applied to the subtract input of the reversible counter 62 to cause it to count down by 1. Also, this same RP–3 is applied to the "pulse-gap" detector 92 to prevent the resetting of the counters 48, 62, and 78.

The next clock pulse from the pulse generator 16 is again passed by the enabled gate 68 to generate a pulse RP–2. This second RP–2 again is applied through the gates 80 and the decoding matrix 82 to actuate read-out of the second character at the memory address corresponding to the 1-count registered in the read-out counter 78. Upon termination of this second RP–2, a second RP-3 is passed by the enabled gate 74 to advance the read-out counter to a count of 2, and again to subtract 1 from the count registered by the reversible counter 62. This read-out operation cycle is repeated periodically as each clock pulse is supplied by the pulse generator 16. Thus, the information characters stored in the memory are read out at the periodic rate of the clock pulses from the generator 16 to the output device 12. Accordingly, the output device receives the information periodically at the frequency *f* of the pulse generator 16.

The delay period of the delay line 18 is equal to or greater than the time required for completing a read-out operation. Due to the relay line 18, the write pulses WP–3 are out-of-phase (25 microseconds) with respect to (before and after) the clock pulses from the generator 16. As a result, the write-in cycle and the read-out cycle can never overlap because each requires less than 25 microseconds. However, the write-in cycles and the read-out cycles are interlaced with respect to the memory 14. Thus, over each clock-pulse cycle, one read-out cycle takes place (after the read-out is started), as many as two write-in cycles and possibly no write-in cycles may take place.

The write-in operations continue repeatedly from the first character supplied in a block from the source 10 until the last character of that block, without pause. The memory capacity is generally substantially less than the size of the block of information supplied from the source 10. However, the memory capacity is chosen with respect to the relative rates of the information source and the read-out operation so that the memory 14 never overflows, and is never empty when a pulse RP–2 is generated unless the information block from the source 10 is already completely transferred to the output device 12. When the write-in counter 48 counts to its capacity, which is the capacity of the memory 14, the counter 48 recycles to a count of 0. Correspondingly, the next input character written in the memory 14 is at the memory address corresponding to a 0-count, which 0-count address has already been emptied by a read-out operation.

After the block of characters from the source 10 is completely written in the memory 14, the input flip-flops 32 remain in their reset conditions. Accordingly, the "and" gate 24 is no longer enabled via the connection 44 and the gate 42, and, consequently, the write pulses WP–4 and WP–5 are no longer generated. During this interval, the clock pulses from the pulse generator 16 continue to generate read pulses RP–2 to complete the read-out operations from the memory 14.

The read-out of the last character from the memory 14 is marked by a special "terminal character" included at the end of the block of characters. This "terminal character" is recognized by the gate 84 to set the flip-flop 86. The 1-output of the flip-flop 86 enables the gate 88 to pass the next WP–1, which pulse WP–1 resets the read-out flip-flop 66 and the flip-flop 86. When the read-out flip-flop 66 is reset, the gate 68 is closed to further clock pulses and the read-out operation is ended.

When the last, or "terminal," character is read-out of the memory 14, the reversible counter registers a count of 0, which 0-count is recognized by the gate 76 to close the gate 74. As a result, no further read pulses RP–3 are applied to the detector circuit 92. After an appropriate period of time corresponding, say, to several clock pulse periods, the detector 92 applies a pulse to the reset terminals of the counters 46, 62, and 78. This reset operation restores these counters 46, 62, 78 to their 0-count conditions.

The 0-count of the write-in counter 48 is recognized by the gate 54 as a count other than the half-full-memory count. The gate 54, therefore, does not provide the enabling voltage from the connection 58, and the gate 64 is closed to succeeding WP–3 pulses. The information system is then in a condition, with all the flip-flops and counters reset and the gates closed, to receive the next block of information from the source 10 and repeat the entire write-in and read-out operation described above.

The information source 10 and the output device 12 may be continuously operated during the transfer of successive blocks of information. Under such circumstances, there would be an extensive blank length of magnetic tape in the output device 12 corresponding to the period during which the initial half-full write-in to the memory 14 is performed. Likewise, the successive blocks of information on the magnetic tape in the information source 10 would have to be properly spaced apart an amount corresponding to the maximum possible time of read-out of the memory 14 after termination of the write-in.

Alternative to such continuous operation of the source 10 and output device 12, intermittent actuation of the source 10 and output device 12 may be provided by means of signals occurring in the system of FIGURE 1 described thus far. For example, the recognition gate 42 may be used to recognize the receipt by the input flip-flops 32 of the "terminal character" to provide a signal at the terminal 94 upon such an occurrence. This terminal 94 may be connected back to the information source to stop the reeling of the magnetic tape of the source 10 when this last character of a block of information is received by the input flip-flops 32. The output connection 60 of the recognition gate 54 may be connected through a delay line 96 to a control input of the output device 12. This connection 60 of the recognition gate 54 may be used to supply a tape-start signal when the write-in counter registers that the first character has been written into the memory 14. The delay line 96 delays the transmission of that tape-start signal on the connection 60 to the output device 12 an appropriate period. This period ensures that the magnetic tape of the output device 12 is started and at a proper speed at the precise time when the memory 14 is half-full and the read-out operation is to start. The pulse at the terminal 90 which marks the read-out of the last terminal character from the memory 14 (and is used to reset the flip-flops 66 and 86) may be also applied to control inputs of both the source 10 and the output device 12. This pulse at the terminal 90 may be used to stop the reeling of the output device tape at that time, and may also be used to start the tape of the information source 10. Thus, the source 10 and output device 12 may be intermittently operated in an appropriate manner consistent with the transfer at optimum speeds of successive blocks of information.

The information storage and transfer system of FIGURE 1 is adapted to handle blocks or messages of information that may be variable in length or size up to a certain maximum. That is, this system may be used to handle blocks of information that are smaller in size than the half-capacity of the memory 14. To the extent that the system of FIGURE 1 has been described thus far, the recognition gate 54 initiates the read-out operation by recognizing when the count in the write-in counter 48 reaches a count corresponding to the half-full state of the memory 14.

The initiation of the read-out operation for information blocks that are smaller than the half-full memory capacity may be provided as follows: The recognition gate 54 is also used to provide an enabling voltage level for an "and" gate 100 via the connection 56 whenever the count of the write-in counter 48 is less than the half-full count. The gate 100 receives a second enabling voltage level via the terminal 94 and recognition gate 42 when the "terminal character" is received by the input flip-flops 32. Thus, under the circumstances of the "terminal character" being received by the input flip-flops 32 in an information block of size less than the half capacity of the memory 14, the gate 100 is opened to pass the write pulse WP–4 associated with the "terminal character."

This pulse WP–4 is applied to the S-input of a flip-flop 102, which flip-flop 102 is used to control an operation designated as "artificial write-in": The 1-output of the flip-flop 102 is used to enable and "and" gate 104, which gate also receives the clock pulses from the generator 16. The output of the gate 104 is applied to the trigger of the write-in counter 48 via the "or" gate 46. The 1-output of the flip-flop 102 is also connected to control and "and" gate 106, which gate 106 also receives the output of the gate 64. The output of the gate 106 is applied to the R-input of the flip-flop 102 and, via the "or" gate 46, to the trigger input of the write-in counter 48.

The operation of "artificial write-in" starts when the flip-flop 102 is set in the manner described above. The gate 104 is then opened to pass successive clock pulses to the write-in counter 48. When the write-in counter reaches the half-full count, the recognition gate 54 supplies an enabling voltage to the gate 64 to complete the opening of that gate 64 to the next write pulse WP–3. This pulse is passed by the gate 64 to set the read-out flip-flop 66 (to initiate the read-out operation in the manner described above). This same pulse WP–3 is also passed by the gate 106 to reset the flip-flop 102 which has now completed its function. This same WP–3 also triggers the count in the counter to one more than the half-full count. As a result, the enabling voltage is removed from the connection 58 and the gate 64 cannot pass subsequent pulses WP–3. Thus, the "artificial write-in" operation permits the system to transfer message lengths of variable size.

The capacity of the memory 14, that is, the number of individual memory locations for information characters, depends upon the difference between the information rates, or frequencies, of the input source 10 and the output device 12, as well as upon the fluctuations that may occur in the frequency of either the input or output device. Another parameter that may affect the size of the memory 14 is the maximum number of successive characters that are to be transmitted as a block from the source 10 to the output device 12. The size of the information determines generally the length of time required for the transfer of a block of information. This transfer time, in turn, is the time over which the frequency differences and fluctuations occur. Therefore, this transfer time tends to determine the size of the memory 14 required to ensure proper transfer of each information block. These parameters also control the number of characters that should be initially written into the memory prior to the start of the first read-out operation, that is, prior to the read-out flip-flop 66 being set.

If the output-device frequency $f$ is always to be less than the frequency of the source 10, the read-out operation may start immediately after the first character is written in the memory 14. However, if the read-out frequency may at any time be greater than the input frequency, some minimum initial write-in is required prior to the start of the first read-out operation, and the capacity of the memory 14 is designed accordingly. This minimum initial write-in is equal to the product of two factors: One factor is made up of the extreme amount that the input frequency may fluctuate to be less than the read-out frequency; these extreme fluctuations in input frequency may be due to the average input frequency being less than the constant frequency $f$ of operation of the output device 12, and also fluctuations that may take place in this input frequency from its average on the low side of the average. The other of the two factors is equal to the overall time between the start of the first read-out operation and the time that the last read-out operation stops. The maximum value of this overall read-out time is equal to the maximum number of characters that a block, or message, may contain divided by the output frequency $f$. Thus, the initial write-in is equal to the product of the factor of the maximum amount that the input frequency is less than the read-out frequency and the factor of the maximum time over which the input may continue to fall behind the read-out. With such an initial write-in, the read-out pulse RP–2 will always find a character in the memory to be read out until the "terminal character" is read out.

The capacity of the memory 14 is greater than the amount of initial write-in if the input frequency may at any time be greater than the output frequency. This capacity of the memory 14 is equal to the amount of initial write-in plus a term that includes the product of the overall time for reading out and the extreme amount that the input frequency may exceed the output frequency. This last product term is the possible amount of excess of input characters over read-out characters during the overall read-out time.

The maximum amount of time for processing a message of a certain maximum length through the memory 14 is equal to the overall time for reading out a message of that length at the fixed frequency $f$ plus the maximum time that may be required to provide the initial write-in if, for example, the extreme variations in input frequency may be less than the output frequency $f$. A message generally should not be entered into the memory 14 before the previous one has been suitably processed to avoid accumulation effects of the frequency differences from message to message.

In the situation assumed of the read-out operation and the repetition frequency of the clock pulses from the pulse generator 16 being at a 10 kilocycle rate, the average information rate of the input source 10 is also 10 kilocycles. The rate of the input source 10 is assumed to fluctuate on either side of the average rate by amounts that are not greater than 6% of the average rate. It is further assumed that the maximum length of an information block supplied by the source 10 is 512 characters. For such a system, the memory capacity required to ensure proper transfer under the aforementioned criteria is 64 characters. The read-out operation is arranged to start after the memory is half-full with an initial write-in of 32 characters. The maximum time required to process a message (one of the maximum length of 512 characters) is the sum of 51.2 milliseconds (for the read-out of the message) and of approximately 3.2 milliseconds (for the initial write-in to half-fill the memory).

This invention is not restricted in its application to the case of the input device having a fluctuating operating rate; the output device may be the one to have a fluctuating rate instead of or in addition to the input device. As indicated above for the case of the input device, the fluctuating device requires a buffer storage register (such as the flip-flops 32) between itself and the memory 14. Also, the clock-pulse timing cycle is arranged to have two quarter-cycles during which the operation with a fluctuating rate may be performed, and only one quarter-cycle for the performance of a periodic operation.

Appropriate forms of gate circuits that may be employed are described in the article "Diode Coincidence and Mixing Circuits" by Tung Chang Chien, in the Proceedings of the I.R.E., May 1950, page 511. The flip-flops may each be a bistable multivibrator such as the Eccles-Jordan trigger circuit, and the binary counters may be of the types that employ such circuits, examples of which are described in the book "High-Speed Computing Devices," McGraw-Hill, 1950, chapter 3. The delay circuits may be electrical delay lines or one-short multivibrators. The memory 14 may be a random-access memory, various types of which are known in the art. One appropriate form of such a random-access memory is a magnetic-core memory described in the copending patent application Serial No. 465,586, filed October 29, 1954, now Patent No. 2,907,004, September 29, 1959, entitled "Serial Memory," which application is assigned to the assignee of this application. This invention is not restricted to any particular form of memory; for example, serial memories of the shift-register type may also be used. An information storage and transfer system embodying features of this invention and using a shift register type of memory is described in the copending patent application Serial No. 616,465, filed October 17, 1956, now Patent No. 2,951,233, August 30, 1960, entitled "Information Storage System," which application is assigned to the assignee of this invention. The source 10 and output device 12 may include control systems of various types for magnetic tape reeling, a suitable one of which is described in U.S. Patent No. 2,750,961. Various types of code recognition gate circuits may be employed, a suitable one being described in U.S. Patent No. 2,648,829. Where the code recognition gate is required to recognize more than one character (such as the gate 54), a separate recognition gate of this type may be required for each different character to be recognized. The reversible counter may be of any suitable type as that described in U.S. Patent No. 2,462,275. The pulse-gap or "hole" detector may be of various types; for example, it may be a circuit in which a voltage across a capacitor is applied to the grid of an electron tube to hold that tube, say, in its cut-off state. The capacitor is, say, discharged by successive pulses RP–3 to hold that tube cut-off. The time constant of the charge path of the capacitor is such, that the capacitor charges to a tube-conductive potential (to generate a reset pulse from that tube) only when there is a gap in the pulse train for an appropriate number of cycles. An example of such a circuit is described in the copending patent application Serial No. 600,937, now Patent No. 2,907,010, September 29, 1959, filed July 30, 1956, and assigned to the assignee of this application.

In accordance with this invention, a new and improved information storage and transfer system is provided. This system may be used to transfer information between information handling devices that operate at different rates. With this system, fluctuations in operating rates may be provided for. The information transfer from one device to another is controlled so that the information is transferred in the proper sequence.

What is claimed is:

1. In combination with an input device having a fluctuating information signal rate and an output device having a uniform information signal rate, an information storage and transfer system for receiving information signals from said input device at its information signal rate and for transferring received information signals to said output device at the latter's information signal rate, said input device being operative to supply continuously a block of information signals of a certain maximum number; said storage and transfer system comprising a memory having a capacity which is only a fraction of that required to store the largest block of information signals; counting means operable to direct the received information signals to appropriate memory locations at a given speed and operable to direct the read-out of said information signals in an order consistent with the order in which they are received and at a speed comparable to said given speed; means for applying, without interruption, a block of said information signals from said input device to said memory; and means for transferring, without interruption, said block of information signals from said memory to the output device during a period of time that overlaps the period of time in which the block of information signals is written into the memory.

2. The combination as set forth in claim 1 and further including means responsive to a substantially half-full condition of said memory operative to initiate the transfer of said block of information signals from said memory to said output device.

3. A memory system comprising, in combination, an input terminal to which information signals may be applied; a memory; write-in means coupled to said input terminal operable to write into said memory, without interruption, and during spaced time intervals a group of information signals which occur in time sequence; counting means for producing a count indicative of the signals written into the memory; and means responsive to said counting means operable to read out the signals in the memory in time sequence and without interruption during periods intermediate said spaced time intervals and, when the read-out has been completed, operable to reset the counting means.

4. A memory system comprising, in combination, an input terminal to which information signals may be applied; a memory; write-in means coupled to said input terminal operable to write into said memory without interruption and during spaced, discrete time intervals a group of information signals which occur in time sequence; counting means for producing a count indicative of the signals written into the memory; and read-out means responsive to a predetermined count recorded in said counting means operable to read out of the signals in the memory in time sequence and without interruption during periods intermediate said discrete time intervals.

5. A memory system comprising, in combination, an input terminal; means for applying time-sequential, asynchronously occurring information signals to said input terminal; a memory; means including a clock pulse generator operable to write a group of information signals into said memory without interruption at a frequency synchronous with the clock pulse generator frequency; counting means responsive to pulses derived from the clock pulse generator for producing a count indicative of the signals written into the memory; and read-out means responsive to a particular count recorded in said counting means and to pulses derived from the clock pulse generator operative to read out the signals in the memory in time sequence and without interruption at a frequency synchronous with the clock pulse generator frequency and during periods interlaced with the writing in of input signals into said memory.

6. A memory system comprising, in combination, input terminals; means for applying to said input terminals signals indicative of information characters and of termination characters, the latter indicating the end cf a block of information; a memory; write-in means coupled to said input terminals operative to write into said memory without interruption, signals indicative of a block information; counting means for producing a count indicative of the characters written into said memory; means responsive to signals indicative of a termination charcter which occurs prior to the time that a predetermined count has been recorded in the counting means, for increasing the count on said counting means until said predetermined count is reached; and read-out means responsive to said predetermined count recorded in said counting means operable to read out the signals in the memory.

7. A memory system comprising, in combination, an input terminal to which information signals may be applied; a memory; write-in means coupled to said input terminal operable to write the information signals into said memory; a first and a reversible second counting means, each operable to produce a count indicative of the signals written into the memory; read-out means responsive to a predetermined count recorded in the first counting means operable to read out the signals in the memory and operable to subtract from the count recorded in the reversible second counting means a count indicative of the signals read out of the memory; and means responsive to a reference count on said reversible second counting means operable to reset the first counting means.

8. A memory system comprising, in combination, an input terminal to which information signals may be applied; a memory; write-in means coupled to said input terminal operable to write the information signals into said memory; a first and a reversible second counting means, each operable to produce a count indicative of the signals written into the memory; read-out means responsive to a predetermined count recorded in the first counting means operable to read out the signals in the memory and operable to subtract from the count recorded in the reversible second counting means a count indicative of the signals read out of the memory; and means responsive to a termination signal read out of the memory operable to terminate the read-out of said memory; and means responsive to the termination of said read-out operable to reset both of said counting means.

9. A memory system comprising, in combination, an input terminal; means for applying information signals which occur at a non-uniform rate to said input terminal; a memory; means including a clock pulse generator for writing the input signals into said memory at a frequency synchronous with the clock pulse generator frequency; a first and a reversible second counting means responsive to pulses derived from the clock pulse generator, each operative to produce a count indicative of the signals written into the memory; means responsive to a predetermined count recorded in said first counting means and to pulses derived from the clock pulse generator operative to produce read-out pulses at a frequency synchronous with the clock pulse generator frequency; means responsive to said read-out pulses for reading out the information stored in the memory; means operative to apply said read-out pulses to said reversible counter in a sense to reduce the count recorded therein to zero; means responsive to said zero count for stopping the application of read-out pulses to said second counter; and means responsive to the absence of said read-out pulses operative to reset both of said counters.

References Cited in the file of this patent

UNITED STATES PATENTS

| | | |
|---|---|---|
| 2,802,203 | Stuart-Williams | Aug. 6, 1957 |
| 2,858,526 | Deutsch | Oct. 28, 1958 |
| 2,907,004 | Chien | Sept. 29, 1959 |
| 2,907,005 | Chien | Sept. 29, 1959 |

FOREIGN PATENTS

| | | |
|---|---|---|
| 156,605 | Australia | May 20, 1954 |